Aug. 2, 1949.   B. B. PASQUINELLI   2,478,053
METHOD AND MEANS FOR TRANSFERRING SHEETS
Filed March 5, 1948   6 Sheets-Sheet 2
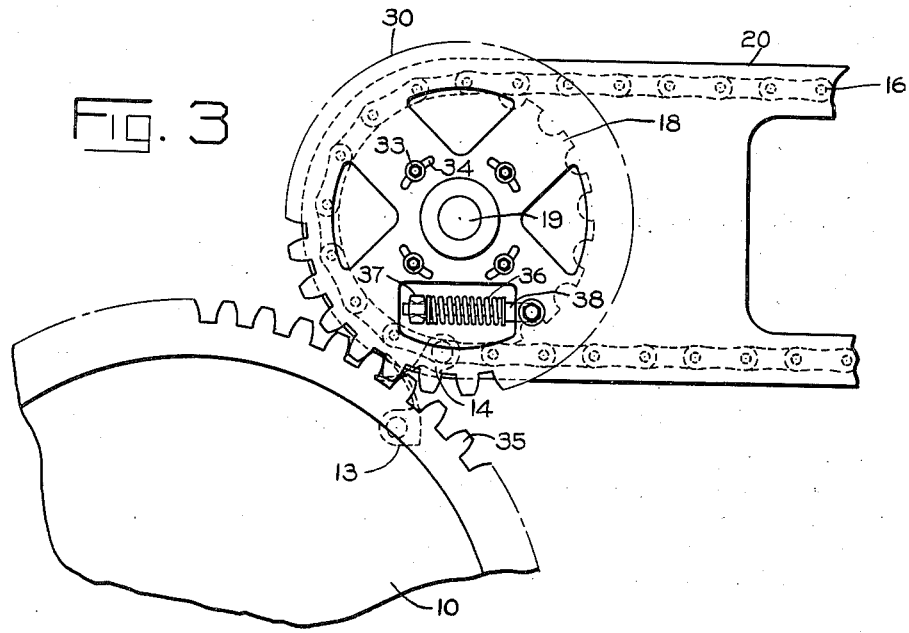
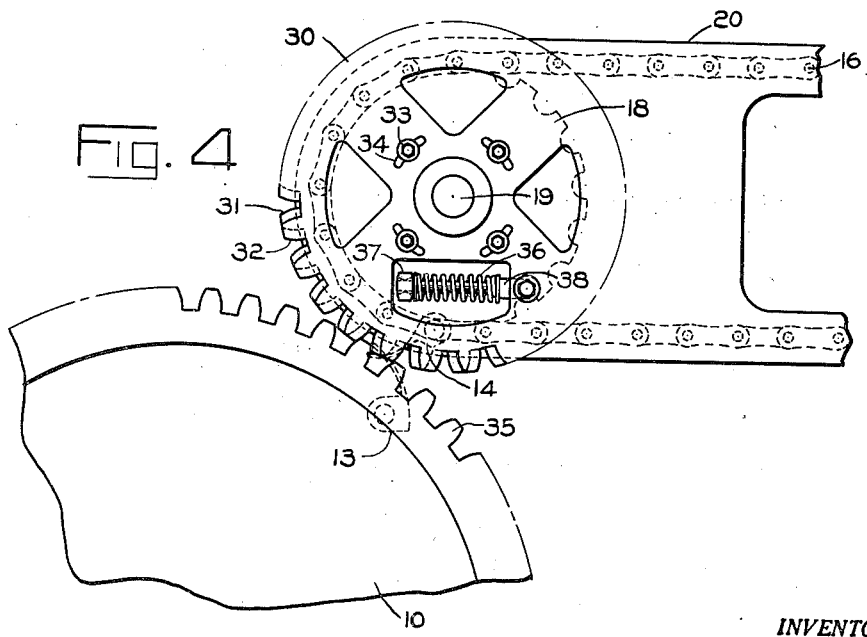
INVENTOR.
Bruno B. Pasquinelli
BY Aug. 2, 1949.  B. B. PASQUINELLI  2,478,053
METHOD AND MEANS FOR TRANSFERRING SHEETS
Filed March 5, 1948  6 Sheets-Sheet 3
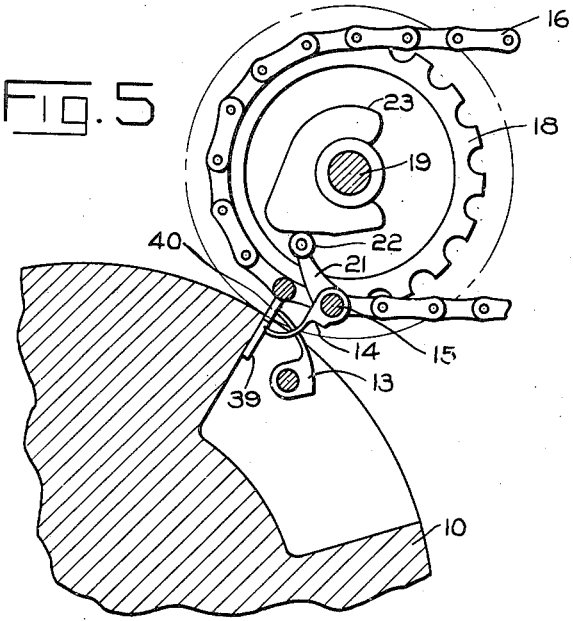
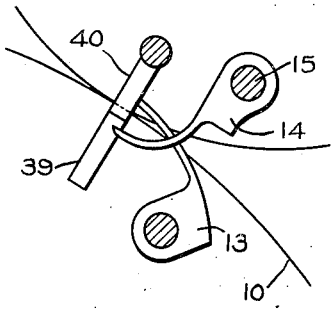
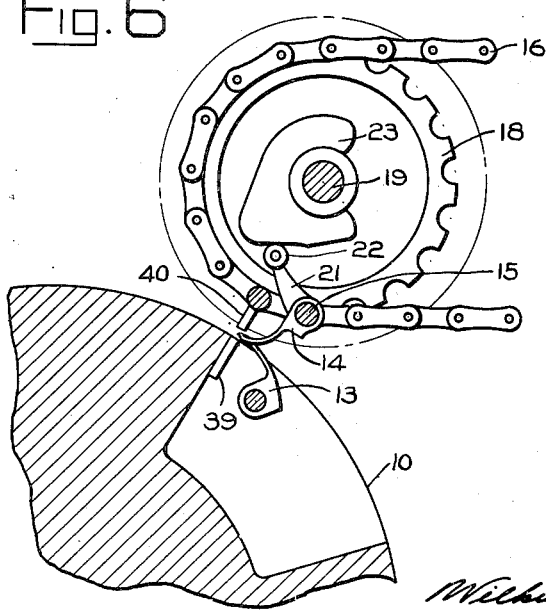
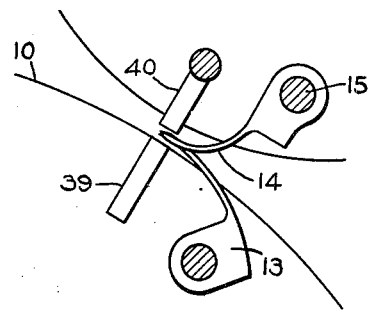
INVENTOR.
Bruno B. Pasquinelli
BY Aug. 2, 1949.  B. B. PASQUINELLI  2,478,053
METHOD AND MEANS FOR TRANSFERRING SHEETS
Filed March 5, 1948  6 Sheets-Sheet 4
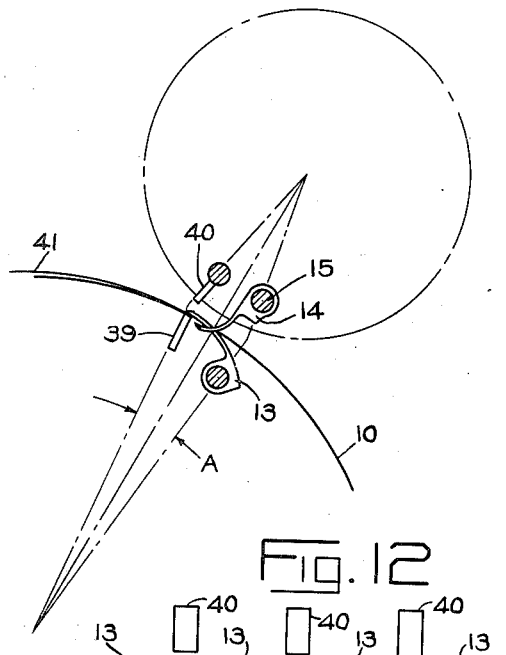
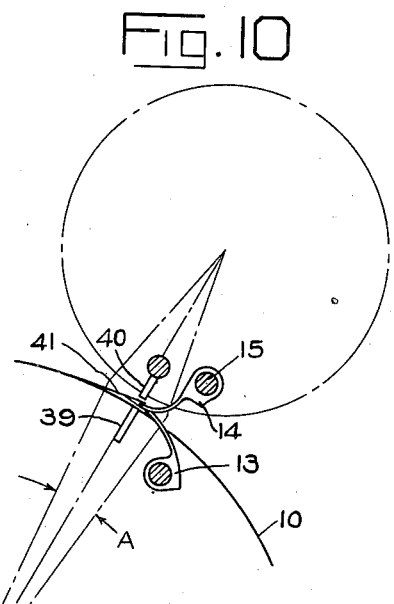
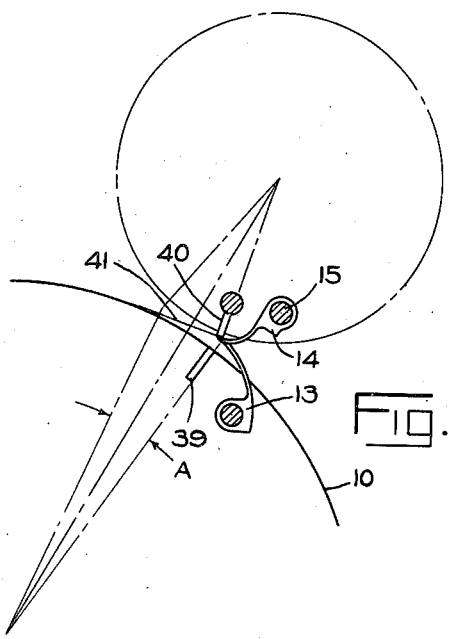
INVENTOR.
Bruno B. Pasquinelli
BY Aug. 2, 1949.   B. B. PASQUINELLI   2,478,053
METHOD AND MEANS FOR TRANSFERRING SHEETS
Filed March 5, 1948   6 Sheets-Sheet 5
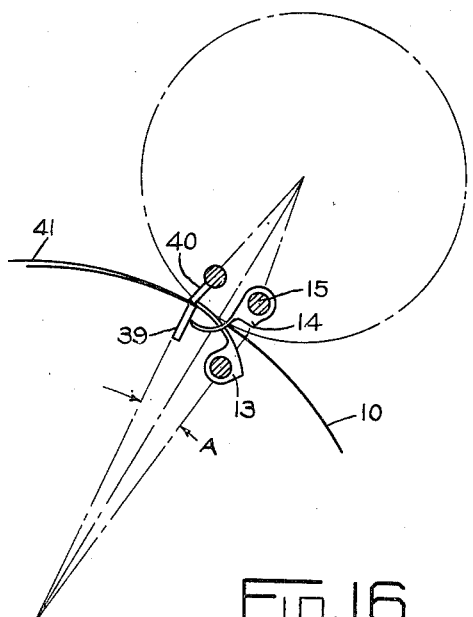
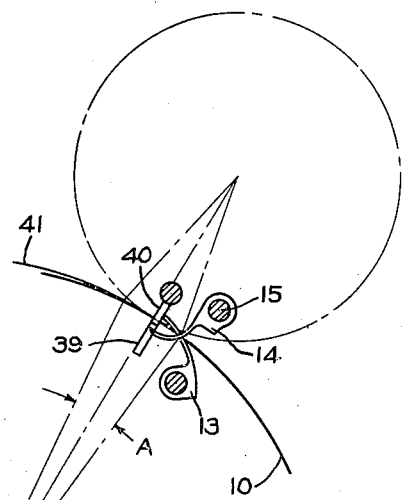
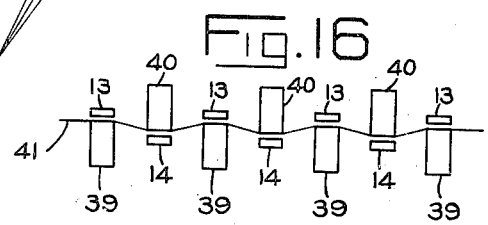
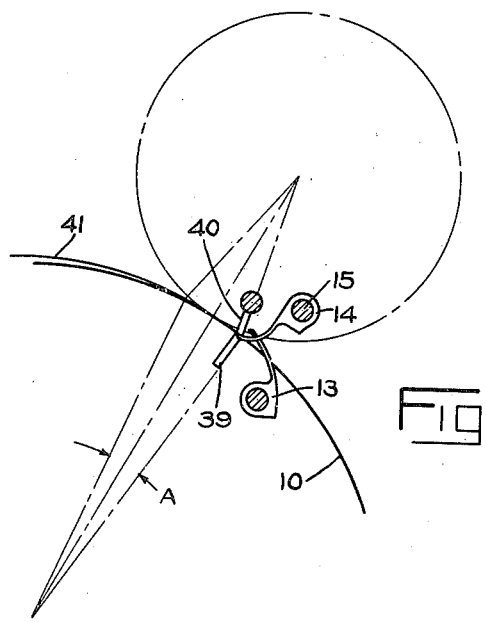
INVENTOR.
Bruno B. Pasquinelli
BY

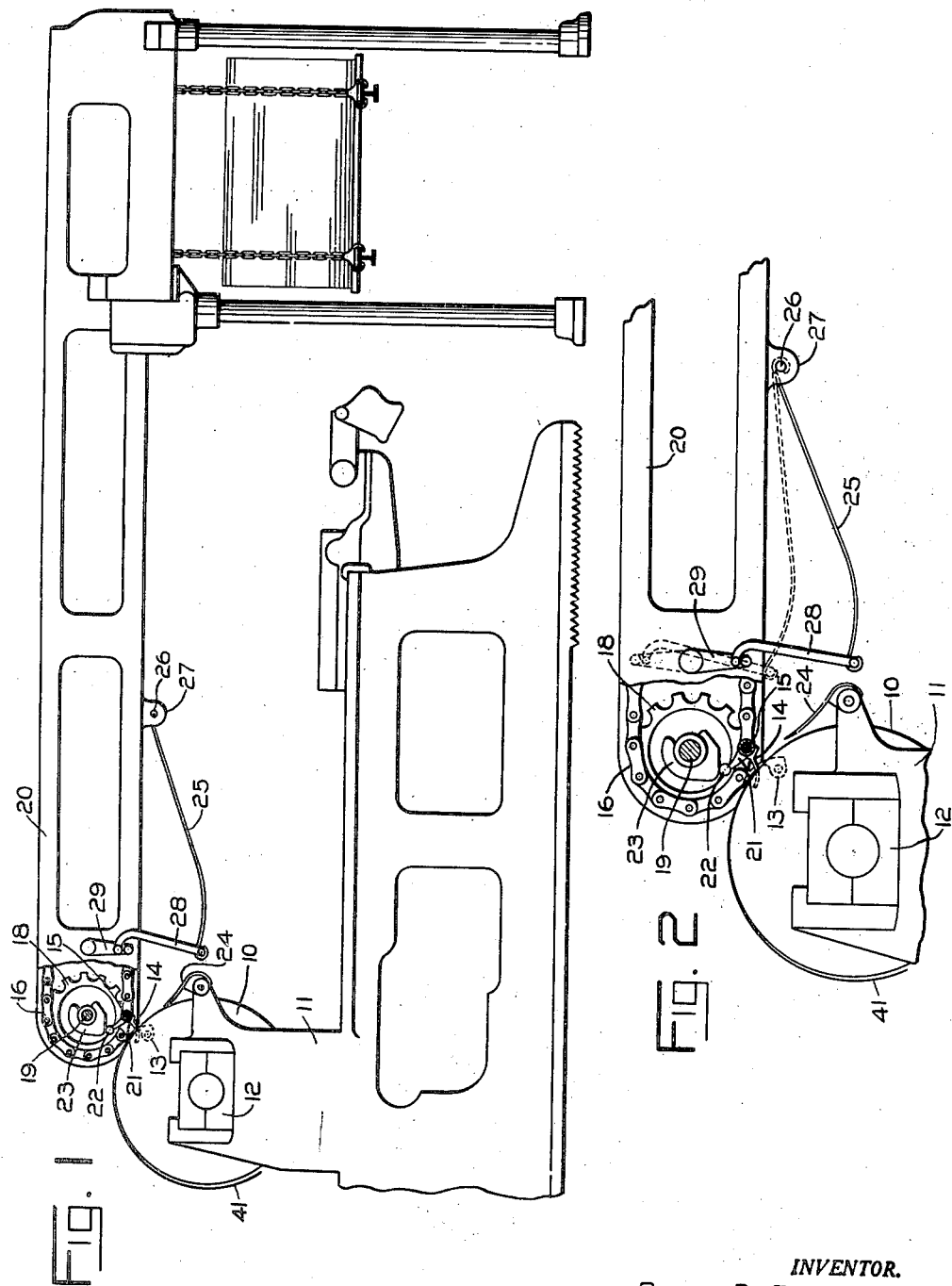

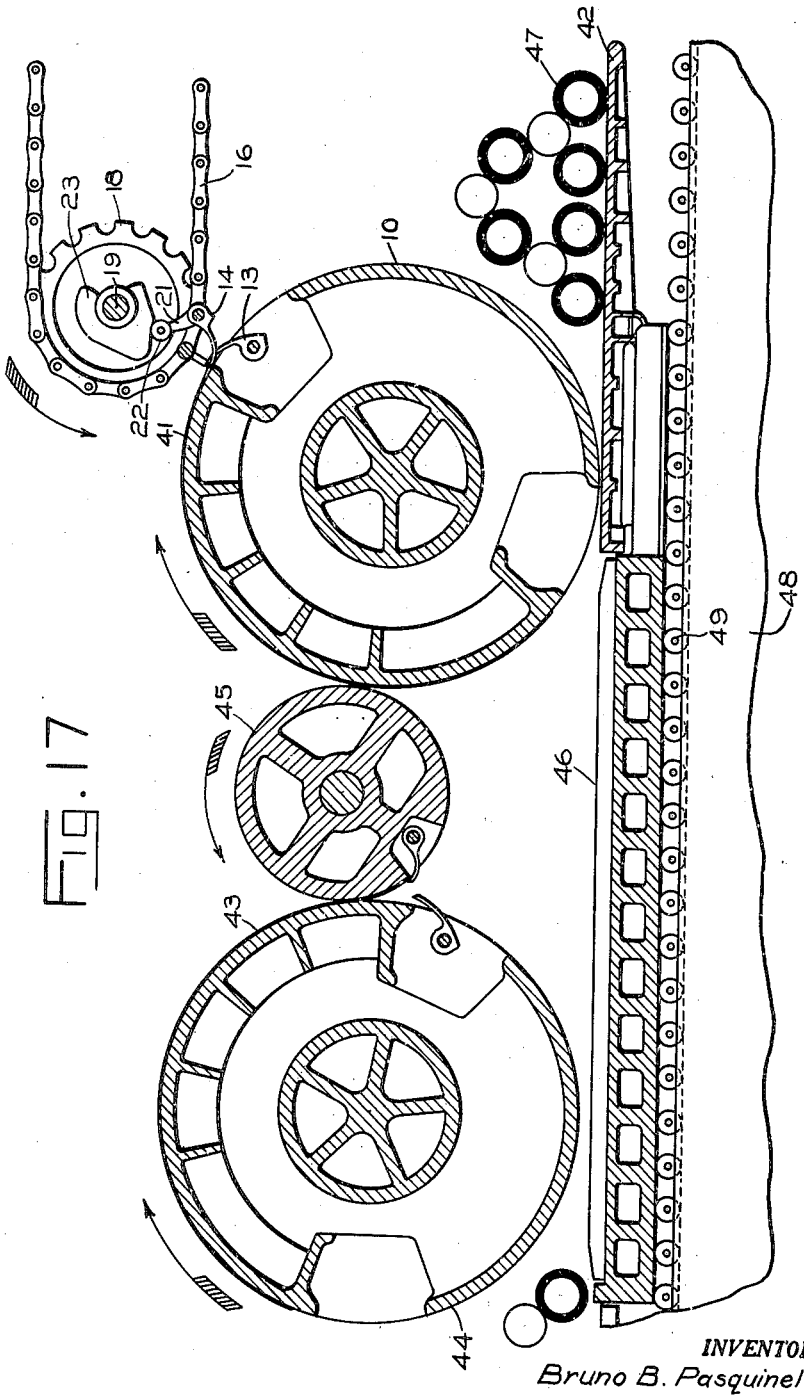

Patented Aug. 2, 1949

2,478,053

UNITED STATES PATENT OFFICE 2,478,053

METHOD AND MEANS FOR TRANSFERRING SHEETS

Bruno B. Pasquinelli, Chicago, Ill., assignor to Miehle Printing Press & Manufacturing Company, Chicago, Ill., a corporation of Delaware Application March 5, 1948, Serial No. 13,143

10 Claims. (Cl. 271—82)

This invention relates to a method and means whereby sheets are transferred from a sheet carrying member such as an impression cylinder of a printing press to a sheet delivery mechanism, preferably of the endless chain type.

More specifically the invention pertains to a constant speed chain delivery and contemplates the control of sheets during their transfer from an impression cylinder of a flat bed printing press to an endless chain conveyor, which cylinder has bodily movement from its operative or printing position to its inoperative or tripped position and vice versa.

In certain types of cylinder flat bed presses, it is required to transfer the printed sheets from the impression cylinder to the delivery conveyor, such as an endless chain, when the cylinder is in either one of its positions, that is to say, when the cylinder is in its printing position as well as when it is in its tripped or non-printing position.

Many complications presented themselves in the attempt to develop a method and means for transferring sheets to a chain delivery from a cylindrical member which assumes two different positions with relation to such delivery, one being tangent thereto or substantially so, while the other position is spaced away from the delivery a distance equal to the bodily displacement of the member.

It has heretofore been suggested to arrange the delivery mechanism so that the entire conveyor at the sheet transfer station will move up and down to follow the motion of the sheet carrying impression cylinder. Such arrangements have proven quite practical and satisfactory when applied to presses of small size where it does not involve the moving of any heavy parts.

However, when larger presses are involved, the problem becomes increasingly more difficult because of the greater weight that has to be lifted by the cylinder raising means. This results in the development of considerable shocks in the cylinder operating mechanism and in vibrations transmitted to the cylinder and its grippers, at the point of sheet transfer, so that the control of the sheets while being transferred is impaired to such an extent that sheets are frequently "lost," that is to say, the sheet grippers of the endless delivery conveyor fail to properly engage the sheets upon release by the cylinder grippers, resulting in loss of time and consequent reduced production.

Furthermore, in order to prevent a sheet from clinging to the cylinder after being released by the cylinder grippers, it has been essential heretofore to provide a series of what are known in the art as "shoo-fly fingers" which function to lift the leading edge of a sheet during its removal from the cylinder. The necessity of such devices is avoided by the novel means which constitute my invention.

One of the primary objects of my invention is to provide a novel method and means whereby printed sheets may be transferred from an impression cylinder or the like member to an endless conveyor, either when the cylinder is down on impression, or when it is raised, i. e. tripped off impression.

Another salient object of the invention resides in the provision of novel means whereby the sheets are controlled during the transfer period from the impression cylinder to the endless conveyor.

Another object of the invention is to provide a mechanism which is simpler in construction and mode of operation than others heretofore used for transferring sheets from a printing- or impression member to a chain delivery mechanism.

A further object of the invention resides in the provision of means whereby any backlash between the driving cylinder gear and the driven chain delivery gear shall be eliminated so that the meshing relation of such gears remains firm and positive whether the cylinder is on or off impression.

A still further object of the invention consists in the provision of an improved sheet guide which will tend to control the trailing portion of a sheet between the points when it is being taken over by the delivery grippers, to the point when the tail end of the sheet is completely free of the impression cylinder.

Another object of the invention is to provide a mechanism which is simple in construction and economical to manufacture.

Still further objects of the invention will become apparent from the following description and appended claims taken in conjunction with the accompanying drawings in which I have illustrated by way of example a preferred embodiment of my invention.

In the drawings:

Figure 1 is a side elevational view showing part of a flat bed printing press and associated chain delivery mechanism to which my invention is applied by way of example;

Figure 2 is an enlarged partial view of Figure 1, illustrating more clearly the arrangement of an adjustable sheet support provided at the sheet receiving end of the delivery mechanism;

Figure 3 represents an enlarged view in side elevation of the cylinder gear and the chain delivery gear driven by it and showing the cylinder in its tripped or raised position;

Figure 4 is a view similar to Figure 3, but showing the cylinder in its lowered or impression position;

Figure 5 is a view, partly in section, showing the impression cylinder in its tripped position, and also illustrating the cam means for opening and closing the chain delivery grippers;

Figure 6 is a view similar to Figure 5, but showing the position of the impression cylinder when it is down on impression;

Figures 7 and 8 are enlarged views, depicting the relative position of the cooperating sheet grippers and pads as shown in Figures 5 and 6 respectively;

Figures 9, 10 and 11 are diagrammatic views showing the various positions of the grippers and their associated pads which they assume at the beginning, intermediate, and at the end of the sheet transfer operation, when the cylinder is on impression;

Figure 12 illustrates diagrammatically the relative position of the cylinder grippers and pads, to the delivery chain grippers and associated pads during the transfer of a sheet when the impression cylinder is on impression, and illustrating how the gripper edge of the sheet is flexed between the gripper fingers midway in the transfer operation;

Figures 13, 14 and 15 are similar views to Figures 9, 10 and 11, but showing the impression cylinder in its tripped position;

Figure 16 is a view similar to Figure 12 but showing how the gripper edge of a sheet is flexed between the cylinder gripper pads and the chain delivery gripper pads midway in the transfer operation and when the impression cylinder is in its tripped position; and Figure 17 is a side elevational view, partly in section, showing my invention as applied to a two-color flat bed press.

Some of the outstanding advantages gained by the introduction of my invention are:

A generally improved performance over sheet delivery devices used heretofore and the ability of transferring sheets from an impression cylinder either when it is on impression or when it is tripped;

The elimination of many conventional operating parts such as shoo-fly fingers and the like sheet controlling elements;

Reduction to a minimum of shocks at the point of sheet transfer, the chain delivery sprockets being supported in fixed bearings;

No backlash between the driving cylinder gear and the driven chain delivery gear;

The delivery chain travels at a constant speed, while the actual speed at which the sheets are delivered is lower than that at the transfer point between the cylinder and the chain conveyor.

Referring now to the drawings which disclose one preferred embodiment of my invention, and as applied to flat bed cylinder presses, the impression cylinder 10, see Figure 1, is mounted in the frame 11 of a flat bed press in any conventional manner, such as in bearings 12 which can be raised and lowered in order to bring the cylinder from its printing to its tripped position and vice versa. The cylinder is provided with a series of grippers 13 to which sheets are fed either by hand or automatically, according to methods well known in the art of printing equipment, and each sheet is held to the cylinder by these grippers while it receives the impression.

After an impression has been made, the printed sheet is transferred to the delivery grippers 14 which are mounted in series on a shaft 15, and in spaced relation to the impression cylinder grippers 13. The gripper shaft in turn is suitably journalled at each end in the endless chains 16 which are provided at each side of the press. The chains 16 are driven by the sprockets 18, rigidly mounted on a drive shaft 19 which in turn is suitably journalled in the side frames 20 of the conveyor. The sprockets 18 are driven in any convenient manner such as by gears which mesh with the cylinder gear, and, as will be understood, a pair of idler sprockets are provided at the other end of the conveyor 20 to support the chains 16 at that point.

Preferably at one end of the gripper shaft 15 and rigidly mounted thereon is the lever 21 having attached at its free end the cam follower 22. Arranged to intercept the follower 22 and thereby open the grippers 14 by action of the lever 21 and shaft 15, is the stationary or fixed cam 23, said cam being fixed to the conveyor frame.

In order to deliver the printed sheets at the slowest possible speed and thus insure more accurate depositing of the sheets onto the pile, the linear speed of the chain conveyor is maintained constant and substantially less than the peripheral speed of the impression cylinder 10. However, the delivery gripper fingers and pads are accelerated to the speed of the impression cylinder at the point of transfer and then, after leaving the sprockets 18, said fingers and pads are again decelerated to the linear speed of the chains until after the sheet has been released onto the pile.

This variation in speed of these grippers is brought about by the difference in radius in which the grippers and associated pads travel, as compared with the pitch line of the sprockets 18. The deceleration of the delivery grippers 14, while the impression cylinder 10 maintains a constant speed, creates a certain amount of slack in the sheet until it is completely separated from the cylinder.

In delivery mechanisms of this type, there is a tendency for the trailing portion of the sheet to cling to the impression cylinder after the leading edge has been transferred and before the delivery mechanism can eliminate the slack in the sheet. Heretofore, it has been customary to use what is commonly known in the art as shoo-fly fingers for the purpose of stripping the trailing part of the sheet from the cylinder. While this method has proven quite satisfactory at low speeds, the mechanism involved for operating such means is expensive and complicated as well as undesirable at higher speeds. To accomplish this stripping of the sheet from the cylinder, I have provided a simple and inexpensive blade 24 which is placed in close proximity to the impression cylinder and which is shaped to strip and guide the sheet as it leaves the cylinder and while it is being withdrawn therefrom.

A guard 25, which is arranged to prevent the trailing edge of the sheet from buckling, or from dropping onto the form rollers or type bed as it leaves the cylinder, is shaped to provide a continuation of the stripping blade 24 and extends across the entire width of the conveyor to fully support the released sheet. The rear edge of this guard is rockably mounted on the shaft 26, said shaft being journalled in the boss 27 of the frame 20 at each side of the conveyor. The free end of the guard 25 is supported by a connecting rod 28 which in turn is connected to a hand crank or lever 29. As shown by the dotted lines in Figure 2, the guard 25 can be adjusted by means of the hand crank 29 in two positions, the purpose of this is to render the form rollers, typeform and impression cylinder of the press readily accessible for inspection and adjustments.

The sprockets 18, and thereby the chains 16 of the delivery mechanism are driven by means of the floating or anti-backlash gear 30 as shown in Figures 3 and 4. This gear consists of two sections, one of which is the drive section 31 and the other the floating section 32. The drive section is rigidly mounted on the shaft 19 while the floating section is rotatable thereon, the two sections being held in their relative positions by the studs 33 which are rigid in the drive section 31, but are slidably inserted through the slots 34 in the floating section 32. This arrangement allows for the floating section 32 to turn a limited degree on the shaft 19 independently of the drive section 31.

When the impression cylinder 10 is in its tripped or inoperative position, as shown in Figure 3, the anti-backlash gear 30 meshes normally with the drive gear 35. However, when the impression cylinder is in its lowered or printing position the teeth of the gears 30 and 35 are separated, as shown in Figure 4, which ordinarily would incur excessive backlash or play.

To compensate for the clearance caused by the separation of the gear teeth, the pressure of the compression spring 36 acting between the projection 37 of the drive section 31 and the end of the rod 38 which is pivotally attached to the floating section 32, tends to move the floating section 32 in a counterclockwise direction. This action causes the teeth of section 32 to exert pressure against the rear face of the teeth on gear 35, forcing the teeth on section 31 to maintain their relative position against the front face of the teeth on gear 35 and having the same effect as advancing the cylinder with respect to the delivery which is necessary to keep the delivery grippers in proper position with respect to the impression cylinder grippers to effect an efficient transfer of the sheet.

During the actual transfer of the sheet from the impression cylinder grippers 13 to the delivery grippers 14, the gripper edge of the sheet is flexed between said grippers, see Figure 12, while the sheet travels a short distance, approximately through the angle A, see Figures 9 to 12, during which time neither the cylinder grippers 13 nor the delivery grippers 14 actually hold the sheet, but provide sufficient control to effect the transfer from the cylinder 10 to the chain conveyor 16. The sheet is controlled while travelling through the transfer zone or angle A by the cylinder grippers 13 and the delivery grippers 14 when the cylinder 10 is in its printing position, see Figure 12, and by the cylinder gripper pads 39 and delivery gripper pads 40, when the cylinder is in its tripped position, see Figure 16. The enlarged diagrammatic view Figure 7 illustrates clearly how the delivery gripper pads 40 extend within the periphery of the impression cylinder when said cylinder is tripped, while Figure 8 indicates the position of the cylinder grippers 13 and the delivery grippers 14 during the transfer of a sheet when the impression cylinder is down in its printing position.

To clearly explain the path of a sheet during its travel through the transfer zone or angle A when the cylinder 10 is on impression, I will refer more specifically to Figures 9, 10, 11 and 12. In Figure 9 the sheet 41 is shown when entering the transfer zone and while still in the bite of the cylinder grippers 13. The delivery grippers 14 are already opened and to a degree that they extend within the periphery of the impression cylinder. As the cylinder 10 continues to rotate the cylinder grippers 13 release the leading edge of the sheet as the delivery grippers 14 rise under the leading edge causing it to be flexed between the cylinder grippers 13 and the delivery grippers 14, as shown in Figures 10 and 12. The two sets of grippers maintain the leading edge of the sheet in this flexed condition until the delivery grippers 14 close on the sheet at which time the cylinder grippers are fully opened and are about to move away from the sheet, see Figure 11. Flexing the gripper edge of the sheet in this manner provides sufficient tension to control the sheet in order to carry it through the transfer zone.

Transfer of the sheet when the cylinder 10 is tripped is quite similar to the steps followed when the cylinder is in its printing position, with the exception that the sheet is flexed between the gripper pads instead of the grippers. Figure 13 shows the sheet about to enter the transfer zone and while still in the bite of the cylinder grippers 13. As the cylinder 10 continues to rotate, the grippers 13 release the sheet and the delivery gripper pads 40 begin to depress the leading edge, thus flexing the sheet between the cylinder gripper pads 39 and the delivery gripper pads 40 as shown in Figures 14 and 16. The sheet 41 remains in this flexed condition until the delivery grippers close on it as shown in Figure 15.

Although my invention can be used on a single or multi-color press with equal efficiency, it is more valuable in connection with a multi-color press since on this type of press the sheet is always transferred to the delivery mechanism while the cylinder is in its printing position, unless for some cause the cylinder is tripped.

For this reason, I will explain the operation of my invention with respect to a two-color press as shown in Figure 17. In this illustration a sheet 41 is in the process of being transferred to the grippers 14 of the delivery mechanism while the impression cylinder 10 is still down in its printing position, having risen only a sufficient amount to clear the ink distributing table 42. The leading edge of the succeeding sheet 43 has been transferred from the first cylinder 44 to the transfer cylinder 45 which will make approximately one revolution and a half before transferring the sheet 43 to the second cylinder 10, which by that time will have delivered sheet 41 to the chain conveyor 16. The type bed or form 46 is shown at the end of its impression stroke with the form rollers 47 in contact with the ink table 42. The form is supported on the press frame 48 in any approved manner, such as by means of the slider carriage rollers 49.

Meanwhile the chain conveyor has continued its rotation around the sprockets 18 causing the cam follower 22 to engage cam 23 moving lever 21 to thus open the delivery grippers 14. When fully opened, said grippers extend within the periphery of the impression cylinder. As the impression cylinder grippers 13 and delivery grippers 14 pass through the transfer area, they follow a path substantially as shown in Figures 9, 10 and 11 with the delivery grippers 14 rising under the leading or gripper edge of the sheet 41 as they begin to close and the cylinder grippers begin to open.

While I have disclosed herein a preferred embodiment of my invention and merely by way of example, it shall be understood that many modifications in the design and in the arrangement of parts may be introduced without departing from the principle involved, therefore, I aim to cover any such departures that will come within the scope and meaning of the appended claims.

I claim:

1. In the method of transferring sheets from a printing cylinder to an endless sheet conveyor, both of which having a series of cooperating sheet gripping elements associated therewith, the steps of releasing a sheet by the gripping elements of said cylinder to an extent that contact with the gripper edge of the sheet is maintained, bringing the sheet gripping elements on said conveyor into contact with the gripper edge of the sheet in a manner that said edge will be flexed between said series of elements to control the sheet, maintaining this flexed condition during the entire period of transfer, and causing the gripping elements of said conveyor to hold the sheet and deliver it.

2. In the procedure of transferring sheets from a printing cylinder to a delivery mechanism, both of which being equipped with a series of sheet engaging gripper fingers and cooperating supports, and which cylinder has bodily movement from its operative to an inoperative position, the novel method of controlling the sheets during their transfer from said cylinder when in its operative position, comprising the steps of releasing a sheet by the gripper fingers on said cylinder to an extent that contact of said fingers is maintained with the gripper edge of the sheet, bringing the gripper fingers on the delivery mechanism into contact with the leading edge of a sheet in a manner that said edge will be flexed between said series of gripper fingers of said cylinder and of said mechanism to control the sheet, maintaining this flexed condition during the entire period of transfer, and closing the series of gripper fingers and cooperating supports of said mechanism to hold the sheet and deliver it.

3. In the procedure of transferring sheets from a printing cylinder to a delivery mechanism, both of which being equipped with a series of sheet engaging gripper fingers and cooperating supports, and which cylinder has bodily movement from its operative to an inoperative position, the novel method of controlling the sheets during their transfer from said cylinder when in its inoperative position, comprising the steps of releasing a sheet by the series of gripper fingers on said cylinder to an extent that the supports associated therewith remain in contact with the gripper edge of the sheet, bringing the series of gripper finger supports of said mechanism into contact with the leading edge of the sheet in a manner that said edge will be flexed between said series of supports to control the sheet, maintaining this flexed condition during the entire period of transfer, and closing the series of gripper fingers and cooperating supports of said delivery mechanism to hold the sheet and deliver it.

4. In sheet transfer mechanism, the combination of a sheet carrier having bodily movement from its operative to an inoperative position, a sheet delivery mechanism having a fixed position in which to receive sheets from said carrier when the latter is in its operative as well as when in its inoperative position, and means for flexing the gripper edge of the sheets to control them during the transfer period from said carrier to the delivery mechanism and while said carrier is in either one of said positions.

5. In sheet transfer mechanism, the combination of a sheet carrying printing cylinder having bodily movement from its printing position to its non-printing position, sheet delivery mechanism having a fixed position in which to receive sheets from said cylinder, and means on said cylinder and on said mechanism including series of sheet engaging gripper fingers and cooperating gripper pads, operative to flex the gripper edge of a sheet between said gripper fingers after the sheet is released from said cylinder and during its transfer to the delivery mechanism, to thereby control the sheet during the period of its transfer when the sheet carrying cylinder is in its printing position.

6. In sheet transfer mechanism, the combination of a sheet carrying printing cylinder having bodily movement from its printing position to its non-printing position, sheet delivery mechanism having a fixed position in which to receive sheets from said cylinder, a series of sheet engaging gripper fingers and cooperating pads on said cylinder, a series of sheet engaging gripper fingers and cooperating pads on said delivery mechanism, both of said series of pads being arranged to cooperate for the purpose of flexing the gripper edge of a sheet between them and to thereby control the sheet during the period of its transfer from the cylinder grippers to the delivery grippers when the cylinder is in its non-printing position.

7. In a sheet transfer mechanism, the combination of a sheet carrying cylinder having bodily movement from an operative position to an inoperative position and having a series of gripper fingers and cooperating pads, a constant speed chain delivery having a fixed position in which to receive sheets from said cylinder, a series of gripper fingers and cooperating pads on said delivery and organized to receive sheets from said cylinder when it is in its operative position as well as when in its inoperative position, driving means for said chain delivery, including gears, and anti-backlash means associated with said gears for maintaining said delivery gripper fingers and pads in their relative position to engage a sheet released by the cylinder gripper fingers and pads while said cylinder is in either one of said positions.

8. In a sheet transfer mechanism, the combination of a sheet carrying cylinder having bodily movement from its printing position to its non-printing position, a constant speed chain delivery mechanism having a fixed position with respect to the sheet carrying cylinder, a series of sheet engaging gripper fingers and cooperating pads on said cylinder, a series of sheet engaging gripper fingers and cooperating pads on said delivery mechanism, both of said series of gripper fingers being operative to flex the gripper edge of a sheet between them and to thereby control the sheet during its transfer from said cylinder to said delivery mechanism while said cylinder is in its printing position and spaced from the delivery mechanism, driving means for said chain delivery, including a train of gears, and anti-backlash means associated with said gears for maintaining the gripper fingers and cooperating pads of said delivery mechanism in their relative positions in order to engage a sheet released by the gripper fingers and cooperating pads on said cylinder, while said cylinder is in its printing position.

9. In a sheet transfer mechanism comprising a combination of elements as set forth in claim 8, the provision of means associated with said cylinder for facilitating the removal of the trailing portion of a sheet therefrom after the leading edge of the sheet has been transferred to the delivery mechanism.

10. In a sheet transfer mechanism comprising a combination of elements as set forth in claim 8, the provision of an adjustable support for guiding the trailing edge of a sheet after it leaves the sheet carrying cylinder and while being conveyed by said delivery mechanism.

BRUNO B. PASQUINELLI.

No references cited.